United States Patent
Schudt et al.

(10) Patent No.: US 6,893,011 B2
(45) Date of Patent: May 17, 2005

(54) UPPER STRUT ASSEMBLY

(75) Inventors: Joseph A. Schudt, Macomb, MI (US); John E. Howard, Fenton, MI (US); Fan Li, Tecumseh (CA)

(73) Assignee: General Motors Corporation, Detroit, MI (US)

( * ) Notice: Subject to any disclaimer, the term of this patent is extended or adjusted under 35 U.S.C. 154(b) by 6 days.

(21) Appl. No.: 10/385,366

(22) Filed: Mar. 10, 2003

(65) Prior Publication Data

US 2004/0178552 A1 Sep. 16, 2004

(51) Int. Cl.$^7$ .............................. F16F 7/12; B60G 15/07
(52) U.S. Cl. ................. 267/220; 188/377; 280/124.155
(58) Field of Search ................ 188/377; 267/195, 267/219, 220, 140, 140.3, 140.4, 151; 280/124.155, 124.147

(56) References Cited

U.S. PATENT DOCUMENTS

| | | | | |
|---|---|---|---|---|
| 3,428,150 A | * | 2/1969 | Muspratt et al. | 188/375 |
| 3,850,049 A | * | 11/1974 | Adams et al. | 74/492 |
| 4,210,343 A | * | 7/1980 | Shiomi et al. | 280/124.108 |
| 4,249,645 A | * | 2/1981 | Level et al. | 188/322.12 |
| 4,711,463 A | * | 12/1987 | Knable et al. | 280/124.155 |
| 6,062,355 A | * | 5/2000 | Nohr et al. | 188/374 |
| 6,199,942 B1 | * | 3/2001 | Carroll et al. | 296/187.05 |

* cited by examiner

Primary Examiner—Xuan Lan Nguyen
(74) Attorney, Agent, or Firm—Laura C. Hargitt

(57) ABSTRACT

An upper strut assembly comprising a strut rod, a jounce bumper, a jounce bumper cup, and an upper strut mount attached to the strut rod by a fastener is disclosed. The strut rod extends about a vertical axis. The jounce bumper axially encompasses the strut rod. The jounce bumper cup includes an upper surface that is fixed about a top portion of the jounce bumper. The upper strut mount limits an anticipated peak force applied to the upper strut assembly.

10 Claims, 6 Drawing Sheets

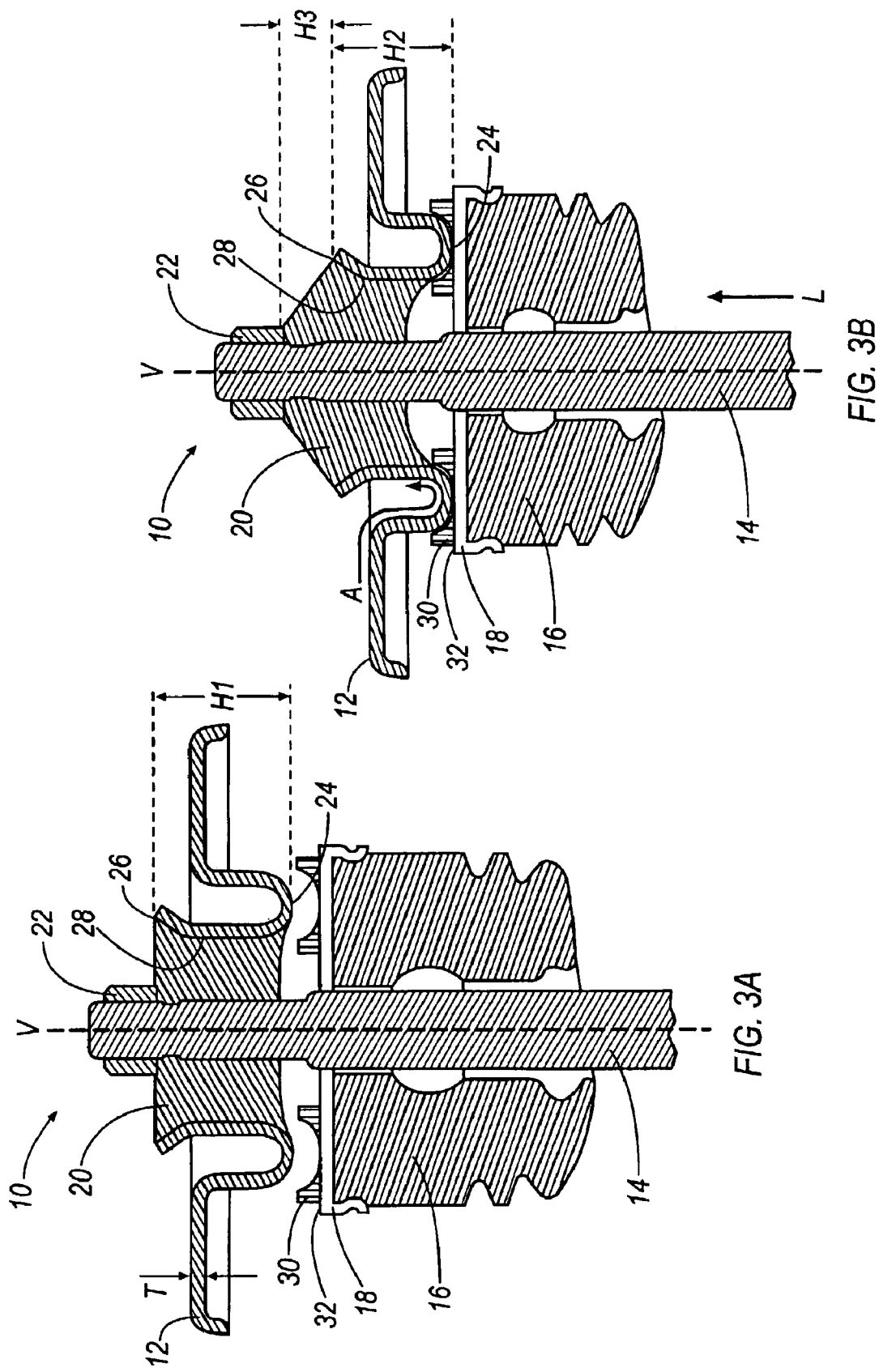

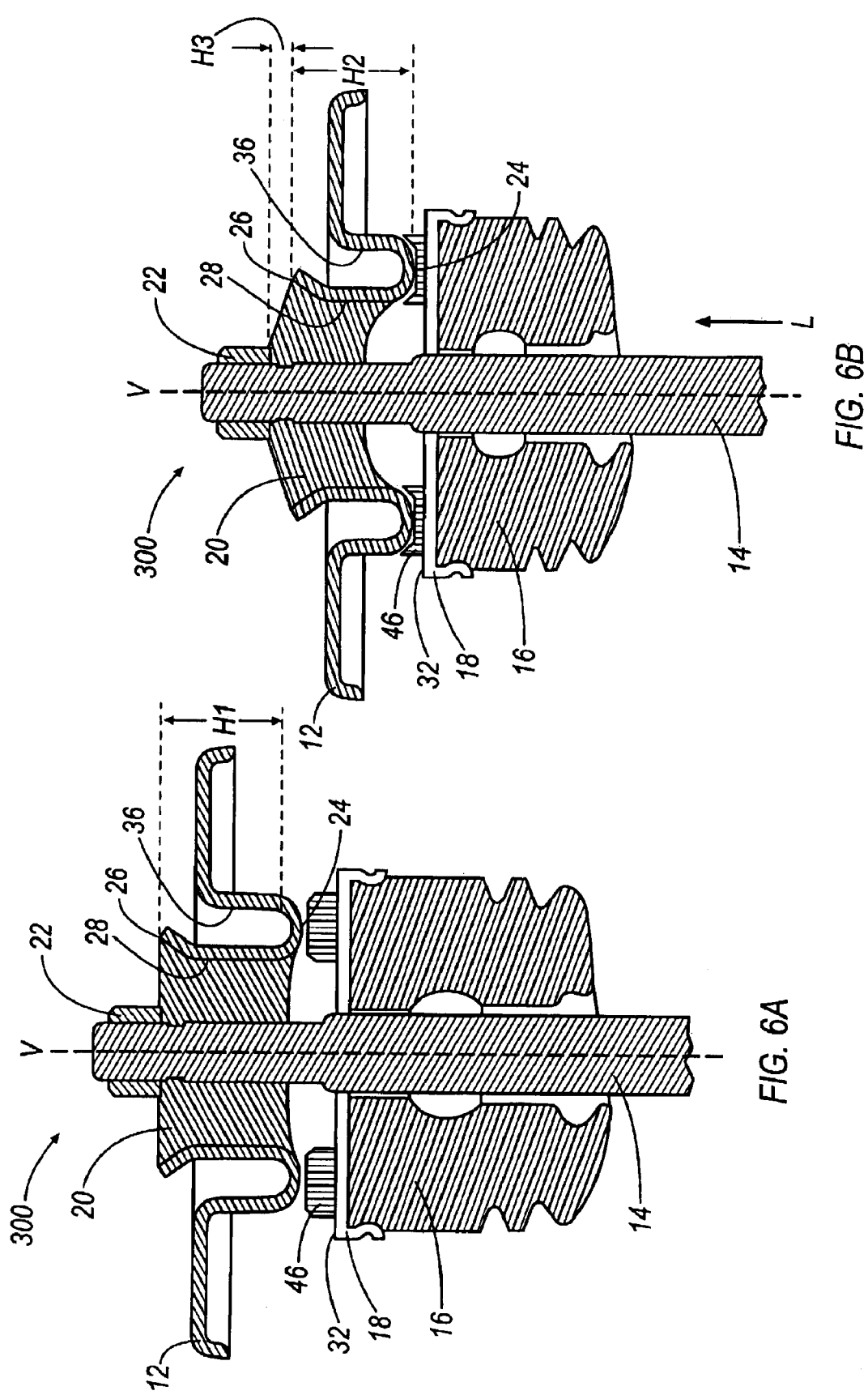

UPPER STRUT ASSEMBLY

BACKGROUND OF THE INVENTION

Field of the Invention

The present invention relates to strut assemblies, and in particular to an upper strut mount that limits an anticipated peak force applied to the upper strut assembly.

Typically, as a wheel's diameter increases and as a tire-section's height decreases (e.g. on low profile tires), a tire/wheel structure of a vehicle tends to have a non-linear increase in structural peak loads transmitted to the vehicle body as a result of driving over a pothole, speed bump, or the like that deflects the wheel at a high velocity towards the vehicle body structure. The structural peak loads are typically carried through the vehicle's suspension that includes a strut assembly located at each of the front and rear wheels. Therefore, the use of larger wheels for low profile tires may be limited in application to certain cars, which restricts and compromises styling flexibility and vehicle ride/handling quality, respectively.

In an attempt to overcome this problem, conventional strut assemblies may interact with either a reinforced portion of the vehicle's body structure or a modification to the jounce bumper for the purpose of controlling structural peak loads. Alternatively, in order to control structural peak loads, additional structure could be attached to the wheel house for the purpose of contacting the tire when the wheel is deflected.

However, such changes or addition of structure to the vehicle body may force load issues into the vehicle chassis that may compromise other vehicle imperatives. Even further, such changes may also increase vehicle mass and cost. Therefore, a need exists for a device that controls structural peak loads while also considering styling performance issues of the vehicle suspension, and vehicle dynamics, mass, and cost.

SUMMARY OF THE INVENTION

In a first embodiment of the invention, a strut assembly is described. The strut assembly comprises a strut rod, a jounce bumper, a jounce bumper cup, and a strut mount attached to the strut rod by a fastener. The jounce bumper is located about the strut rod. The jounce bumper cup includes a surface that is fixed about the jounce bumper. The strut mount deforms under high impact conditions.

Another embodiment of the invention is an upper strut assembly that includes an upper strut mount that limits an anticipated peak force applied to a mount side of the strut assembly about a bottom portion of the upper strut mount. The upper strut assembly includes an axial cradle having a lip. The axial cradle is located on the upper surface of the jounce bumper cup and is positioned in opposing relationship to the upper strut mount for receiving the bottom portion of the upper strut mount. The axial cradle is sized such that it initiates material yielding and flow of the upper strut mount as the upper strut mount is pulled about the vertical axis of the strut rod.

Another embodiment of the upper strut assembly that limits an anticipated peak force applied to a mount side of the strut assembly also includes an axial stop ring located around an outer periphery of the upper strut mount. The lip of the axial cradle is designed to directly contact the axial stop ring once the anticipated peak force has been achieved.

Another embodiment of the upper strut assembly includes an upper strut mount that limits an anticipated peak force applied to a mount side of the strut assembly. The upper strut assembly includes a flexible portion that permits resilient deformation of the upper strut mount. The upper strut assembly also includes an axial rib welded to the upper strut mount in opposing relationship to a deformable stop ring. The deformable stop ring comprises a ductile material that catches and deforms about the rib as the upper strut mount is pulled about the vertical axis of the strut rod.

Another embodiment of the upper strut assembly includes an upper strut mount that limits an anticipated peak force applied to a contact side of the strut assembly about a bottom portion of the upper strut mount. The upper strut assembly includes an axial crush cup located on an upper surface of the jounce bumper cup. The axial crush cup is positioned in opposing relationship to the upper strut mount for receiving the bottom portion of the upper strut mount so that the axial crush cup can be crushed and deformed under pressure by the bottom portion of the upper strut mount as the upper strut mount is pulled about the vertical axis of the strut rod.

Various additional aspects and advantages of this invention will become apparent to those skilled in the art from the following detailed description of the preferred embodiment, when read in light of the accompanying drawings.

BRIEF DESCRIPTION OF THE DRAWING

FIG. 3A is a cross-sectional view of the upper strut assembly according to FIG. 1;

FIG. 3B illustrates a cross-sectional view of the upper strut assembly according to FIG. 3A after the upper strut mount is deformed;

FIG. 6A is an alternate embodiment of the upper strut assembly illustrated in FIG. 1; and FIG. 6B illustrates a cross-sectional view of the upper strut assembly according to FIG. 6A after a structure attached to the jounce bumper cup is deformed.

DESCRIPTION OF THE PREFERRED EMBODIMENTS

Figure 1:
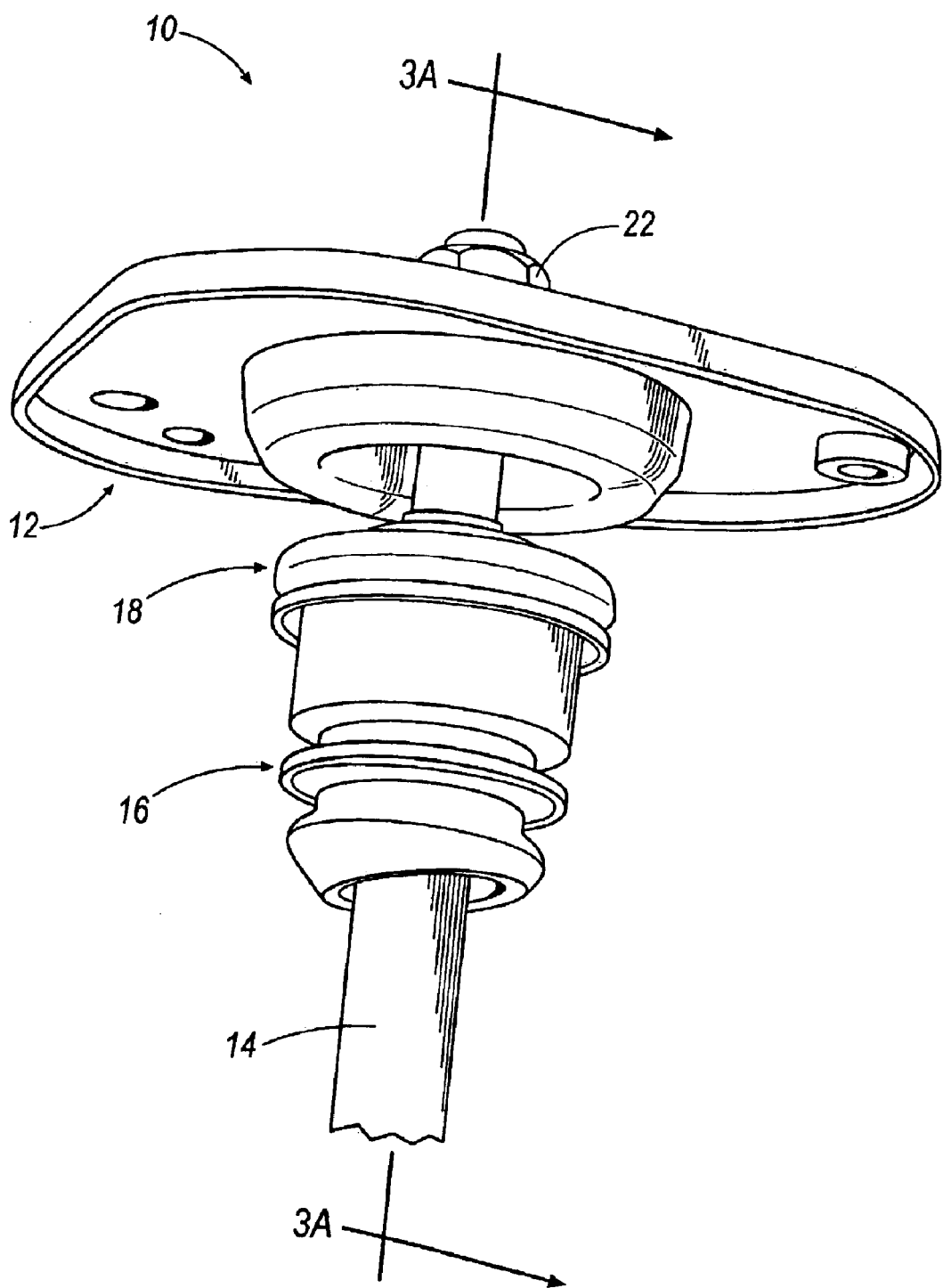
FIG. 1 is a perspective view of an upper strut assembly according to one embodiment of the invention.

Referring to FIG. 1, an upper strut assembly, which is shown generally at 10, accommodates higher structural peak loads by permitting the material of an upper strut mount 12 to flow in a direction generally indicated by the arrow, A (FIG. 3B). Accordingly, the upper strut assembly 10 acts as a structural fuse that limits an undesirable load, which is shown to generally act on the upper strut assembly 10 in a direction indicated by the arrow, L (FIG. 3B), applied to the vehicle body (not shown) as a result from driving over a pothole, speed bump, or the like. The undesirable load limit may be further defined by a maximum acceptable deformation input, such as an anticipated (or predetermined) peak force threshold F1, F2, F3, or F4 (FIG. 2).

The upper strut mount 12 may comprise any desirable ductile steel, such as iron; however, some irons may be undesirably heavy. Alternatively, rather than being a completely solid, heavy part, the upper strut mount 12 may either fully or partially comprise a steel material having a rigid honeycomb structure that essentially decreases the overall weight of the upper strut mount 12 while maintaining its structural rigidity. The overall design of the upper strut assembly 10 is also flexible so that any desirable limitation of the anticipated peak force F1, F2, F3, or F4 may be accommodated. For example, the upper strut mount 12 may be designed to have any desirable gauge thickness, T (FIG. 3A), so that the material of the upper strut mount 12 may flow and deflect in a controlled fashion. Essentially, by modifying the gauge thickness, T, the upper strut mount 12 may limit any desirable anticipated peak force F1, F2, F3, or F4 applied to the vehicle body.

Figure 2:
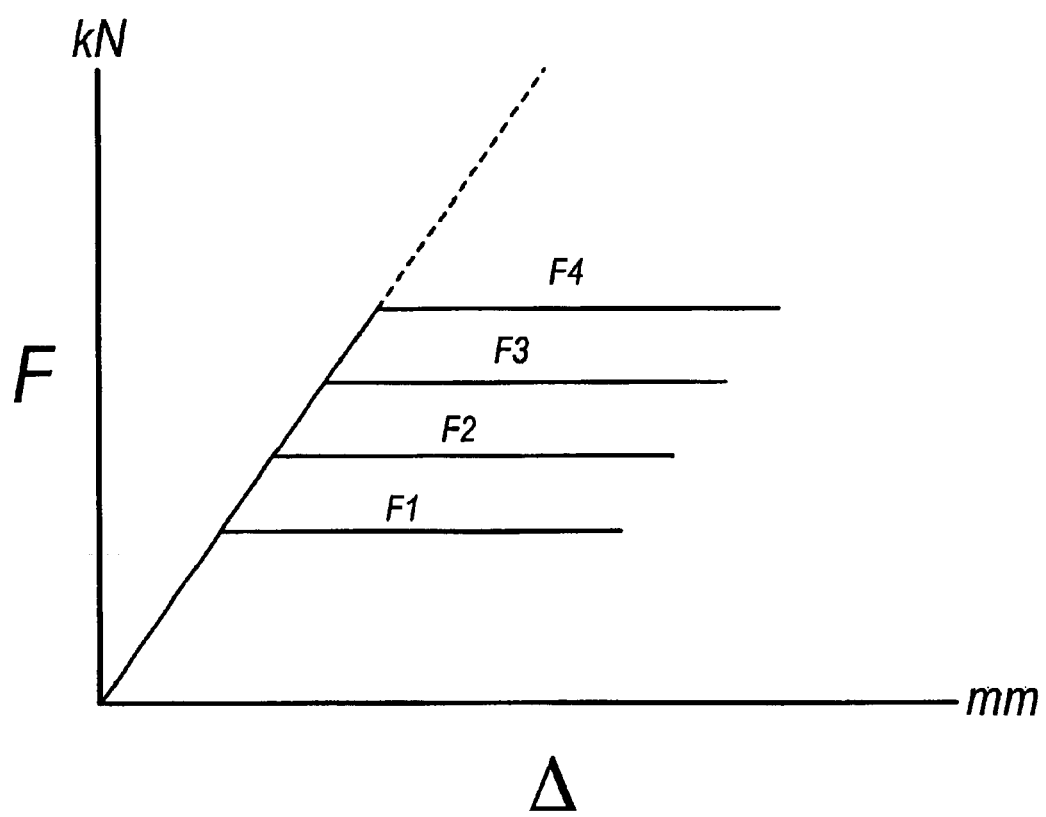
FIG. 2 is a chart illustrating force versus yielding deflection of an upper strut mount according to FIG. 1.

As illustrated in FIG. 2, during a loading event, the yielding of the material, Δ, of the upper strut mount 12 will increase as the undesirable load, which is defined by a force, F, increases. The physical migrating capability of the upper strut mount 12 is determined by how much yielding, Δ, occurs, and thereby prevents a force, F, greater than the maximum anticipated force F1, F2, F3, or F4 to cause undesirable damage to the vehicle body. Although the material of the upper strut mount 12 yields and flows, the upper strut mount 12 does not deform beyond a certain acceptable amount; the upper strut mount 12 removes structural peak loads by deforming and changing in shape so that most of the energy defined by the anticipated peak force F1, F2, F3, or F4 that would otherwise be transmitted the vehicle's structural body is restrained and limited by the upper strut assembly 10.

Referring to FIG. 3A, prior to deformation of the upper strut assembly 10, the upper strut mount 12 is defined to have an initial height, H1. The initial height, H1, is defined to be approximately the distance measured from a bottom portion 24 of the upper strut mount 12 to the top of a rubber mount 20. After deformation of the upper strut assembly 10, a technician or user may observe a slightly lesser height, H2 (FIG. 3B), or a slightly greater height, H2+H3 (FIG. 3B), of the upper strut mount 12.

In operation, the upper strut assembly 10 may result in the material flow of the upper strut mount 12, thereby causing the upper strut mount 12 to marginally decrease from the height, H1, to the height, H2, as the material of the upper strut mount 12 pulls through about a generally vertical axis, V, of a strut rod 14. In another possible situation, the anticipated peak force F1, F2, F3, or F4 may be great enough to cause the rubber mount 20 to stretch, thereby marginally increasing the overall height of the upper strut mount 12 to a height H2+H3 that is greater than the height H1. Therefore, in a service inspection, a user or technician may visually observe if the upper strut assembly 10 has been deformed. The user or technician may also notice deformation of the upper strut assembly 10 if a device, such as a gauge cap (not shown), does not sit flush with the upper strut mount 12. Alternatively, a user or technician may also look for worn or leaky shocks, a bent wheel rim, or damage to a corner of the vehicle, which may result in an alignment issue, to find out if deformation of the upper strut assembly 10 has occurred.

As illustrated in FIG. 3A, a first embodiment of the upper strut assembly 10 comprises at least the upper strut mount 12, the strut rod 14, a jounce bumper 16, a jounce bumper cup 18, and the rubber mount 20. The jounce bumper cup 18 is fixed about a top portion of the jounce bumper 16 that axially encompasses the strut rod 14. The upper strut mount 12 is attached to the strut rod 14 by a fastener 22. The rubber mount 20 extends axially from the strut rod 14 to an inner periphery 28 of the upper strut mount 12. The upper strut assembly 10 also comprises an axial cradle 30 that is located on an upper surface 32 of the jounce bumper cup 18. The axial cradle 30 is positioned in opposing relationship to the upper strut mount 12 and is designed to receive the bottom portion 24 of the upper strut mount 12. Referring to FIG. 3B, once the anticipated peak force F1, F2, F3, or F4 is applied in the direction as illustrated by the arrow, L, the rubber mount 20 may deform and the axial cradle 30 is sized such that it initiates material yielding, Δ, and flow in the direction generally indicated by the arrow, A, so that undesirable energy is removed by the upper strut mount 12 as the upper strut mount 12 is pulled about the generally vertical axis, V, of the strut rod 14.

Figures 4A, 4B:
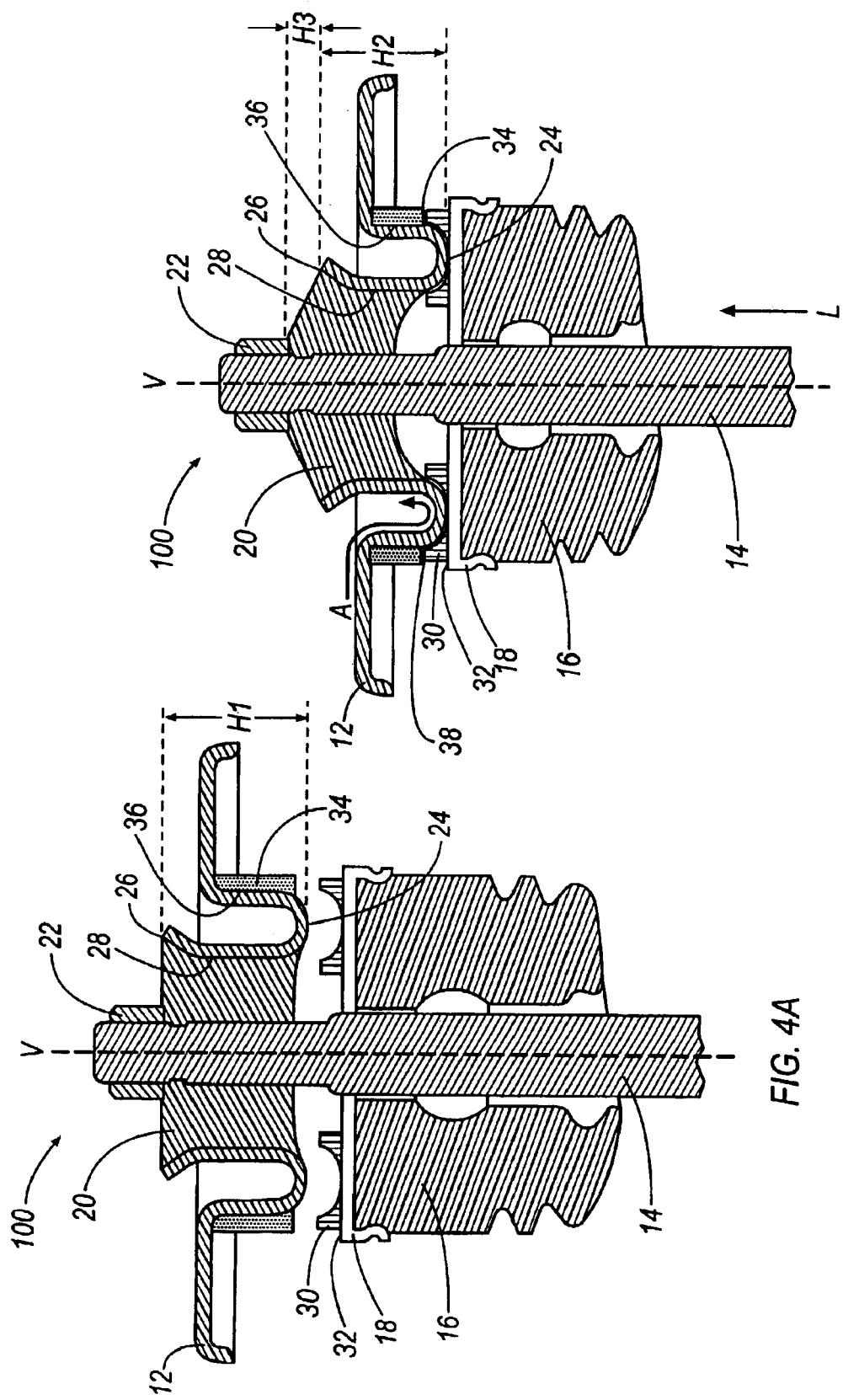
FIG. 4A is an alternate embodiment of the upper strut assembly illustrated in FIG. 1.
FIG. 4B illustrates a cross-sectional view of the upper strut assembly according to FIG. 4A after the upper strut mount is deformed.

As seen in FIGS. 4A and 4B, another embodiment of the invention is an upper strut assembly 100. The upper strut assembly 100 generally includes the same structure of the upper strut assembly 10 as seen in FIG. 3A; however, the upper strut assembly 100 further comprises an axial stop ring 34 located around an outer periphery 36 of the upper strut mount 12. As seen in FIG. 4B, an outer lip 38 of the axial cradle 30 is designed to directly contact the axial stop ring 34 once the anticipated peak force F1, F2, F3, or F4 applied in the direction as illustrated by the arrow, L, has been achieved. Essentially, the axial stop ring 34 assists in consistently stopping material flow of the upper strut mount 12 upon engaging the anticipated peak force F1, F2, F3, or F4.

Figures 5A, 5B:
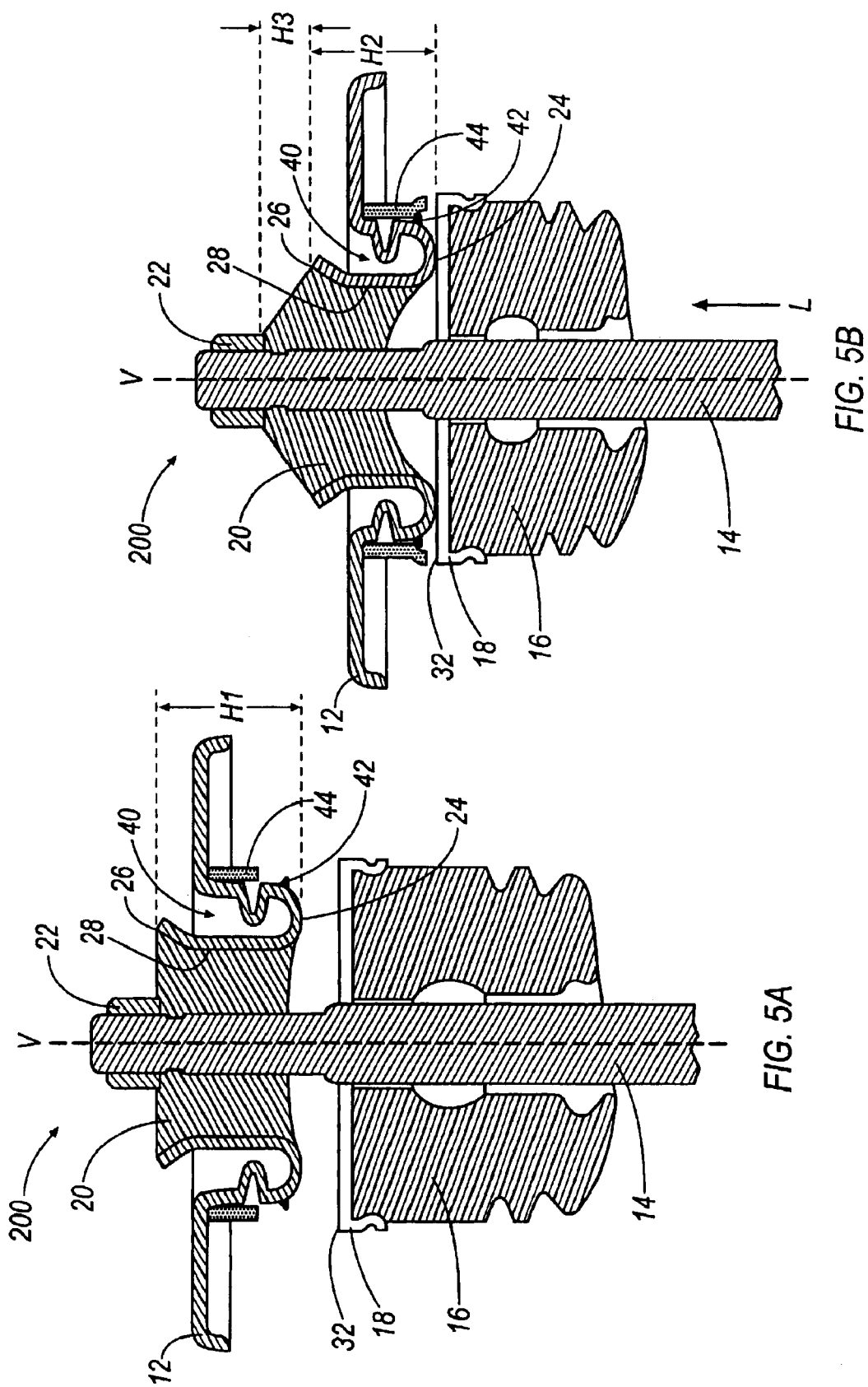
FIG. 5A is an alternate embodiment of the upper strut assembly illustrated in FIG. 1.
FIG. 5B illustrates a cross-sectional view of the upper strut assembly according to FIG. 5A after the upper strut mount is resiliently deformed.

As seen in FIGS. 5A and 5B, another embodiment of the invention is an upper strut assembly 200. The upper strut assembly 200 generally comprises the same structure of the upper strut assembly 10; however, the upper strut assembly 200 does not include the axial cradle 30 located on the upper surface 32 of the jounce bumper cup 18. As illustrated, the upper strut assembly 200 includes a flexible portion 40. Essentially, because the upper strut assembly 200 does not include the axial cradle 30, resilient deformation of the upper strut mount 12 occurs about the flexible structure 40, and inducement of material flow of the upper strut mount 12 is obviated.

If additional structure of the upper strut assembly 200 is needed for the purpose of limiting higher structural peak loads, the upper strut assembly 200 may further comprise an axial rib 42 and a deformable stop ring 44 that is located about an opening of the flexible portion 40. The axial rib 42 may be a strip or a ring of rigid material that is welded to the outer periphery 36 of the upper strut mount 12 at a location in opposing relationship to a bottom portion of the deformable stop ring 44. The deformable stop ring 44 may be made from a ductile material that is designed to catch and deform about the axial rib 42 so that undesirable, damaging energy is removed as the upper strut mount 12 is pulled about the vertical axis, V, of the strut rod 14.

As seen in FIG. 6A, another embodiment of the invention is an upper strut assembly 300. The upper strut assembly 300 generally comprises the same structure of the upper strut assembly 10; however, the upper strut assembly 300 does not include the axial cradle 30 located on the upper surface 32 of the jounce bumper cup 18. Alternatively, the upper strut assembly 300 includes an axial crush cup 46 located on the upper surface 32 of the jounce bumper cup 18. The axial crush cup 46 is positioned in opposing relationship to the upper strut mount 12 and is designed to receive the bottom portion 24 of the upper strut mount 12.

As seen in FIG. 6B, the axial crush cup 46 is illustrated to be a solid member that is crushed and deformed under pressure by the bottom portion 24 of the upper strut mount 12 so that undesirable energy is removed from the system as the upper strut mount 12 is pulled about the vertical axis, V, of the strut rod 14. Essentially, once the axial crush cup 46 is deformed, it may be easily removed and replaced with a new axial crush cup 46 rather than having to replace a new upper strut mount 12 during a service inspection. Although not illustrated, if desired, the axial crush cup 46 may alternatively be a ductile, hollow structure.

The overall design of the upper strut assemblies 10, 100, 200, and 300 depend on how the vehicle is configured, which then results in varying anticipated peak forces F1, F2, F3, or F4 called for in a specific design. Essentially, the strut assemblies 10, 100, 200 and 300 are designed to limit structural peak loads applied to the vehicle body by deforming a structure of the upper strut assembly 10, 100, 200, or 300. As illustrated in FIGS. 3B and 4B, the upper strut mount 12 of the strut assemblies 10 and 100 are designed to be permanently deformed by causing the material of the upper strut mount 12 to yield and flow. Alternatively, as seen in FIG. 5B, the upper strut mount 12 of the upper strut assembly 200 resiliently deforms at a flexible structure 40. In yet other alternative embodiments as seen in FIGS. 5B and 6B, a replaceable structure, such as the deformable stop ring 44 or axial crush cup 46 of the strut assemblies 200 and 300, respectively, may be deformed as opposed to permanently or resiliently deforming the material of the upper strut mount 12.

Essentially, according to the illustrated embodiments of the invention, undesirable energy, such as a structural peak load, is dissipated by either deforming a portion of the strut assembly 10, 100, or 200 on a "mount side" (FIGS. 3B, 4B, and 5B) or by deforming a structure attached to a portion of the strut assembly 300 on the "contact side" (FIG. 6B). The strut assemblies 10, 100, 200, and 300 each limit structural peak loads while also considering styling performance issues of the vehicle suspension, and vehicle dynamics, mass, and cost. Therefore, larger wheels may be used on certain vehicles that permit styling flexibility while also increasing vehicle ride/handling quality. Even further, jounce bumpers may be also be made shorter than typical jounce bumpers when employing the inventive strut assembly.

Although certain preferred embodiments of the present invention have been described, the invention is not limited to the illustrations described and shown herein, which are deemed to be merely illustrative of the best modes of carrying out the invention. For example, a person of ordinary skill in the art will realize that certain modifications and variations, such as deforming a lower portion of the strut assembly, will come within the teachings of this invention and that such variations and modifications are within its spirit and the scope as defined by the claims.

What is claimed is:

1. A strut assembly, comprising:
a strut rod;
a jounce bumper located adjacent to the strut rod;
a jounce bumper cup attached to the jounce bumper, wherein an upper surface of the jounce bumper cup is fixed to a top portion of the jounce bumper,
a strut mount attached to the strut rod, wherein the strut mount is adapted to deform whenever a force is applied to the strut assembly exceeds a predetermined force threshold so as to limit the force on a mount side of the strut assembly near a bottom portion of the strut mount; and
at least one axial cradle having a lip, wherein the axial cradle is located on the upper surface of the jounce bumper cup and is positioned in opposing relationship to the strut mount for receiving the bottom portion of the strut mount, wherein the axial cradle is sized and shaped such that the axial cradle initiates the plastic deformation of the bottom portion of the upper strut mount as the strut mount is pulled about a vertical axis of the strut rod and the bottom portion of the strut mount, which is shaped to correspond to the shape of the axial cradle, contacts the axial cradle.

2. The strut assembly of claim 1, wherein the upper strut mount includes an axial stop ring located around an outer periphery of the upper strut mount, wherein the lip of the axial cradle is designed to directly contact the axial stop ring once the predetermined force threshold has been exceeded.

3. The strut assembly of claim 1, wherein the strut mount is an upper strut mount and is fabricated from steel.

4. The strut assembly of claim 3, wherein the upper strut mount is fabricated using a rigid honeycomb structure.

5. The strut assembly of claim 3, wherein the upper strut mount comprises a gauge thickness specified for yielding steel at the anticipated peak load applied to the upper strut assembly.

6. The strut assembly of claim 1, wherein the axial cradle has a concave shape to receive a corresponding shaped bottom portion of the strut mount.

7. The strut assembly of claim 1, wherein the jounce bumper axially encompasses the strut rod.

8. An upper strut assembly, comprising:
a strut rod extending about a vertical axis;
a jounce bumper that axially encompasses the strut rod;
a jounce bumper cup including an upper surface that is fixed about a top portion of the jounce bumper; and
an upper strut mount attached to the strut rod by a fastener, wherein the upper strut mount limits an anticipated peak force applied to a mount side of the strut assembly about a bottom portion of the upper strut mount, wherein the upper strut assembly includes an axial cradle having a lip, wherein the axial cradle is located on the upper surface of the jounce bumper cup and is positioned in opposing relationship to the upper strut mount for receiving the bottom portion of the upper strut mount, wherein the axial cradle is sized such that the axial cradle initiates the plastic deformation of the bottom portion of the upper strut mount as the upper strut mount is pulled about the vertical axis of the strut rod, and the bottom portion of the strut mount contacts the axial cradle.

9. The strut assembly of claim 8, wherein the axial cradle has a concave shape to receive a corresponding shaped bottom portion of the upper strut mount.

10. An upper strut assembly, comprising:
a strut rod extending about a vertical axis;
a jounce bumper that axially encompasses the strut rod;
a jounce bumper cup including an upper surface that is fixed about a top portion of the jounce bumper; and an upper strut mount attached to the strut rod by a fastener, wherein the upper strut mount limits an anticipated peak force applied to a mount side of the strut assembly about a bottom portion of the upper strut mount, wherein the upper strut assembly includes an axial cradle having a lip, wherein the axial cradle is located on the upper surface of the jounce bumper cup and is positioned in opposing relationship to the upper strut mount for receiving the bottom portion of the upper strut mount, wherein the axial cradle is sized such that the axial cradle initiates the plastic deformation of the bottom portion of the upper strut mount as the upper strut mount is pulled about the vertical axis of the strut rod, and the bottom portion of the strut mount contacts the axial cradle, wherein the upper strut assembly includes an axial stop ring located around an outer periphery of the upper strut mount, wherein the lip of the axial cradle is designed to directly contact the axial stop ring once the anticipated peak force has been achieved.

* * * * *